Nov. 19, 1929.    E. P. CRESSLER    1,736,071
VIEW CHANGER FOR STEREOSCOPES
Filed Oct. 19, 1927    2 Sheets-Sheet 1
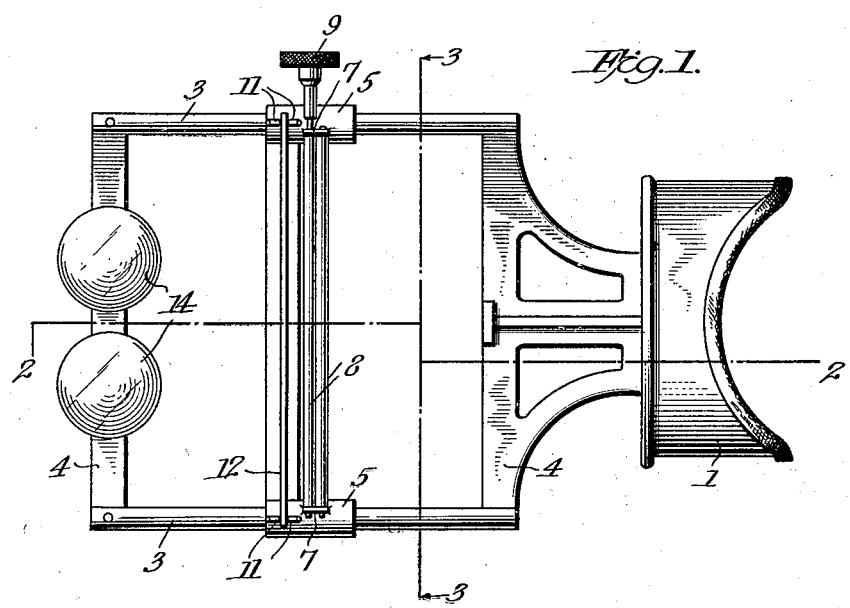
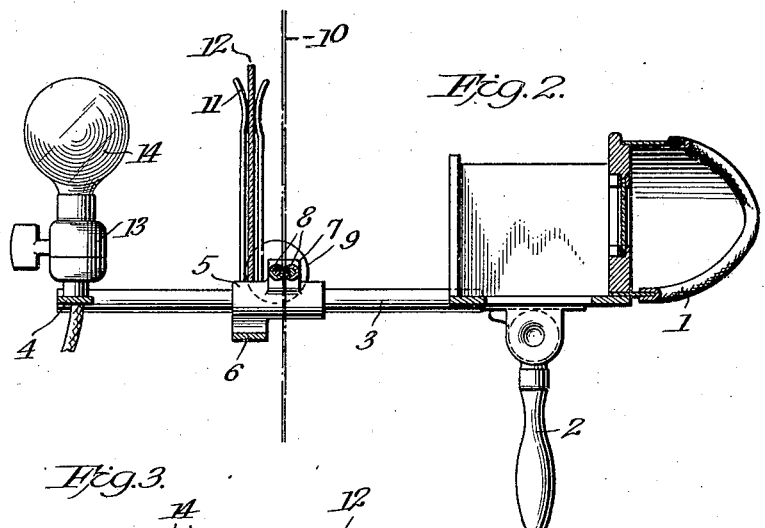
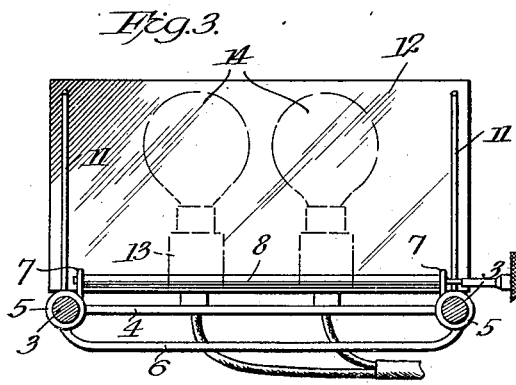
Inventor
Edward P. Cressler
By Rogers, Kennedy & Campbell
Attorney Nov. 19, 1929.  E. P. CRESSLER  1,736,071
VIEW CHANGER FOR STEREOSCOPES
Filed Oct. 19, 1927  2 Sheets-Sheet 2
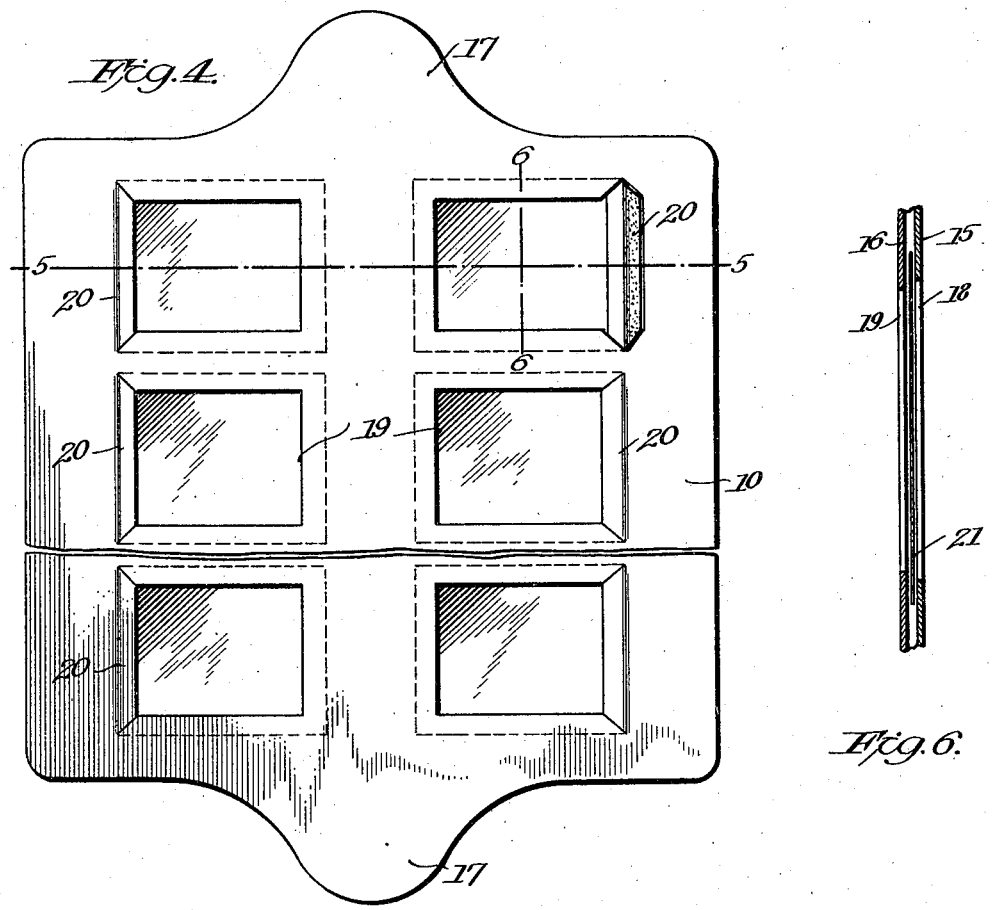
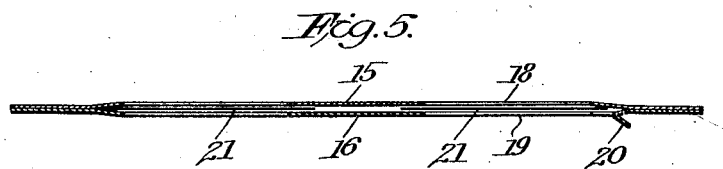
Inventor
Edward P. Cressler
By Rogers Kennedy Campbell
Attorney Patented Nov. 19, 1929

1,736,071

UNITED STATES PATENT OFFICE

EDWARD P. CRESSLER, OF NEWTON, KANSAS

VIEW CHANGER FOR STEREOSCOPES

Application filed October 19, 1927. Serial No. 227,272.

This invention relates to view-changers for stereoscopes and contemplates the provision of an attachment for stereoscopes to facilitate changing views when a plurality of pictures are mounted on a single mat or mount.

In modern dentistry it is often necessary to take a plurality of X-ray pictures of a patient's mouth and teeth, two views being taken of each part for use with a stereoscope. When a plurality of such pictures are made, it is now the custom to mount them in pairs on separate mounts or cards, which often results in the several mounts relating to one patient becoming separted and lost. Also, to observe the various pictures in turn, it is necesary to remove one mount from the stereoscope and substitute another therefor. By my invention these difficulties are overcome by first providing a mount on which all of the pictures relating to one "case" may be mounted and providing means which may be attached to a stereoscope and by which means the pictures on the mount are successively brought into alignment with the lenses of the stereoscope.

It is therefore an object of this invention to provide an attachment for stereoscopes including a pair of friction rollers between which a picture-mount may be inserted, the rollers being rotatable so that the picture-mount may be raised or lowered at will.

Another object of the invention is to provide a frame for attachment to a stereoscope and which frame is provided with means for changing the views, means for illuminating the pictures, and a light-diffusing screen between the illuminating means and the pictures.

It is also an object of the invention to provide a mount on which a plurality of pairs of X-ray films may be mounted for use with a stereoscope.

Other objects and advantages will in part be obvious and in part more fully brought out as the description proceeds.

In the accompanying drawings I have illustrated an embodiment of my invention, but it is to be understood that the drawings are illustrative, merely, and are in no way to be considered as limiting the invention to the details of construction therein shown. The invention is susceptible of embodiment in a variety of other forms without departing from the spirit and scope of the invention as defined in the appended claims.

In these drawings:

Figure 1 is a plan view of a stereoscope and a view-changer attachment of my invention;

Fig. 2 is a section taken substantially on line 2—2 of Figure 1;

Fig. 3 is a section on line 3—3 of Figure 1;

Fig. 4 is a front view of a picture-mount of my invention;

Fig. 5 is a section on line 5—5 of Fig. 4; and

Fig. 6 is a section on line 6—6 of Fig. 4.

Referring now to the drawings, the reference numeral 1 indicates a stereoscope of any well known construction and which is provided with the usual handle 2. Attached to the stereoscope is a frame consisting of side bars 3, 3 and cross pieces 4, 4. Slidably mounted on each of the side bars is a sleeve or collar 5, these sleeves being connected by a cross piece 6 so that they may be moved in unison. The sleeves 5, 5 are provided with bearings 7, 7 for a pair of friction rollers 8, 8 which may be constructed of metal rods covered with rubber or similar material. These rollers are so located as to be in contact and yet because of yielding covering they will permit of the passage of a picture-mount between them. One of the rollers 8 is provided with a knob 9 by which it may be rotated. It will now be clear that when a picture-mount 10, indicated by dotted lines in Fig. 2, is inserted between the rollers 8, it will be held frictionally therein and that when the rollers are rotated, the picture-mount may be raised or lowered as desired.

Also mounted on the sleeves 5, 5 and in back of the rollers, are spring clips 11, 11 adapted to support a light-diffusing glass screen 12 of any well known construction. On the cross piece 4, in back of the light screen are mounted sockets 13, 13 for the reception of electric bulbs 14, 14. The arrangement is best shown in Fig. 2 from an inspection of which it will be clear that light passes from the electric bulbs 14 through the screen 12, thence through the X-ray films on the picture-mount 10 and thence to the eye of the observer.

A film mount of my invention is illustrated in Figs. 4, 5 and 6, the mount comprising a backing 15 and a facing 16, secured together, in parts, by adhesive and provided with reduced portions or tongues 17 to facilitate the insertion of the mount between the friction rollers 8 as hereinbefore described. The backing is provided with apertures 18 and the facing with apertures 19, the latter being smaller than the former and superposed thereon, thus providing a frame around the inside of the registering apertures. Along one edge of the apertures in the facing, a tab 20 is cut out, which tab is bent out of the plane of the facing to facilitate the insertion of an X-ray film 21 between the backing and facing, after which it is bent back and secured to the film by adhesive previously applied to the tab.

It will now be clear that I have provided a device which is exceedingly simple in construction and operation and which possesses many advantages as will be apparent to those skilled in this art.

I claim:

1. A view-changer for stereoscopes including a frame, sleeves slidably mounted in said frame, bearings on said sleeves, a pair of friction rollers journaled in said bearings, and means to rotate said rollers.

2. A view-changer for stereoscopes including a frame having side bars, sleeves slidably mounted on said side bars, bearings on said sleeves, a pair of friction rollers journaled in said bearings, and means to rotate said rollers.

3. In a stereoscope, the combination of a frame provided with bearings, friction rollers journaled in said bearings and adapted to receive a picture-mount, illuminating means on said frame, and a light-diffusing screen between said illuminating means and said picture-mount.

4. A view-changer for stereoscopes including a frame having side bars, sleeves slidably mounted on said bars, bearings on said sleeves, a pair of friction rollers journaled in said bearings and adapted to receive a picture-mount therebetween, illuminating means on said frame, and a light-diffusing screen supported on said sleeves between the illuminating means and the picture-mount.

5. A view-changer for stereoscopes including a frame, friction rollers rotatably mounted on said frame and adapted to receive therebetween a picture-mount, means to rotate said rollers to move the pictures on said mount successively into alignment with the lenses of the stereoscope, and means to adjust said rollers to bring the pictures into focus.

6. In a stereoscope, a view-changer including a frame, friction rollers rotatably mounted on said frame and adapted to receive a mount provided with a vertical series of pictures, means to rotate said rollers to move said mount vertically to position the pictures successively in alignment with the lenses of the stereoscope, and means to adjust said rollers horizontally to bring the pictures into focus.

In testimony whereof I affix my signature.

EDWARD P. CRESSLER.